United States Patent
Song et al.

(10) Patent No.: US 10,079,097 B2
(45) Date of Patent: Sep. 18, 2018

(54) CAPACITOR STRUCTURE FOR POWER DELIVERY APPLICATIONS

(71) Applicant: QUALCOMM Incorporated, San Diego, CA (US)

(72) Inventors: Young Kyu Song, San Diego, CA (US); Hong Bok We, San Diego, CA (US); Kyu-Pyung Hwang, Newton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 14/736,219

(22) Filed: Jun. 10, 2015

(65) Prior Publication Data

US 2016/0365196 A1    Dec. 15, 2016

(51) Int. Cl.
| | |
|---|---|
| H01G 4/228 | (2006.01) |
| H01G 4/30 | (2006.01) |
| H01G 4/012 | (2006.01) |
| H01G 4/12 | (2006.01) |
| H01G 2/06 | (2006.01) |
| H01G 4/232 | (2006.01) |

(52) U.S. Cl.
CPC ............ *H01G 4/228* (2013.01); *H01G 2/065* (2013.01); *H01G 4/012* (2013.01); *H01G 4/12* (2013.01); *H01G 4/232* (2013.01); *H01G 4/30* (2013.01)

(58) Field of Classification Search
CPC .. H01G 4/30; H01G 4/00; H01G 4/35; H01G 4/12; H01G 4/005; H01G 4/012; H01G 4/228
See application file for complete search history.

(56) References Cited

U.S. PATENT DOCUMENTS

| | | | |
|---|---|---|---|
| 6,700,772 B2 | 3/2004 | Raghavendra et al. | |
| 7,808,768 B2 | 10/2010 | Togashi | |
| 8,144,449 B2* | 3/2012 | Onishi | H01G 4/232 361/278 |
| 2003/0169556 A1* | 9/2003 | Yokoyama | B05C 1/027 361/309 |
| 2008/0074826 A1 | 3/2008 | Lee et al. | |
| 2010/0206624 A1 | 8/2010 | Feichtinger | |
| 2014/0022695 A1 | 1/2014 | Schmidt | |
| 2014/0262463 A1* | 9/2014 | Lee | H05K 1/183 174/260 |

FOREIGN PATENT DOCUMENTS

JP    2000049038 A    2/2000

OTHER PUBLICATIONS

International Search Report and Written Opinion—PCT/US2016/033038—ISA/EPO—dated Aug. 3, 2016.

* cited by examiner

*Primary Examiner* — Nguyen Ha
(74) *Attorney, Agent, or Firm* — Seyfarth Shaw LLP

(57) ABSTRACT

A passive discrete device may include a first asymmetric terminal and a second asymmetric terminal. The passive discrete device may further include first internal electrodes extended to electrically couple to a first side and a second side of the first asymmetric terminal. The passive discrete device may also include second internal electrodes extended to electrically couple to a first side and a second side of the second asymmetric terminal.

18 Claims, 9 Drawing Sheets

(Top View)

(Perspective View)

(Cutaway View)

(Top View)

(Side View)

CAPACITOR STRUCTURE FOR POWER DELIVERY APPLICATIONS

BACKGROUND

Field

Aspects of the present disclosure relate to semiconductor devices, and more particularly to a capacitor structure for power delivery applications.

Background

The process flow for semiconductor fabrication of integrated circuits (ICs) may include front-end-of-line (FEOL), middle-of-line (MOL), and back-end-of-line (BEOL) processes. The front-end-of-line process may include wafer preparation, isolation, well formation, gate patterning, spacer, extension and source/drain implantation, silicide formation, and dual stress liner formation. The middle-of-line process may include gate contact formation. Middle-of-line layers may include, but are not limited to, middle-of-line contacts, vias or other layers within close proximity to the semiconductor device transistors or other like active devices. The back-end-of-line process may include a series of wafer processing steps for interconnecting the semiconductor devices created during the front-end-of-line and middle-of-line processes. Successful fabrication of modern semiconductor chip products involves an interplay between the materials and the processes employed.

For integrated circuits in wireless communications devices or other high-speed digital electronics, a power delivery network supplies power to the various components of the overall system. A power delivery network may include a voltage regulator module that regulates voltage for a component. Resonance in a power delivery network is undesirable. Suppressing resonance in a power delivery network may be performed using a capacitor. Surface mount technology (SMT) capacitors may reduce power delivery network resonance/noise in high power, system on chip devices, such as application processors and graphics processors.

SUMMARY

A passive discrete device may include a first asymmetric terminal and a second asymmetric terminal. The passive discrete device may further include first internal electrodes extended to electrically couple to a first side and a second side of the first asymmetric terminal. The passive discrete device may also include second internal electrodes extended to electrically couple to a first side and a second side of the second asymmetric terminal.

A method of fabricating a passive discrete device may include plating first internal electrodes and second internal electrodes within a multilayer ceramic body. The method may also include dipping the multilayer ceramic body at a non-orthogonal angle to define a first asymmetric terminal and a second asymmetric terminal. The method may further include plating the first asymmetric terminal to electrically couple the first internal electrodes at a first side and a second side of the first asymmetric terminal. The method may further include plating the second asymmetric terminal to electrically couple the second internal electrodes at a first side and a second side of the second asymmetric terminal.

A passive discrete device may include a first asymmetric terminal and a second asymmetric terminal. The passive discrete device may further include a first means for electrically coupling to a first side and a second side of the first asymmetric terminal. The passive discrete device may also include a second means for electrically coupling to a first side and a second side of the second asymmetric terminal.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
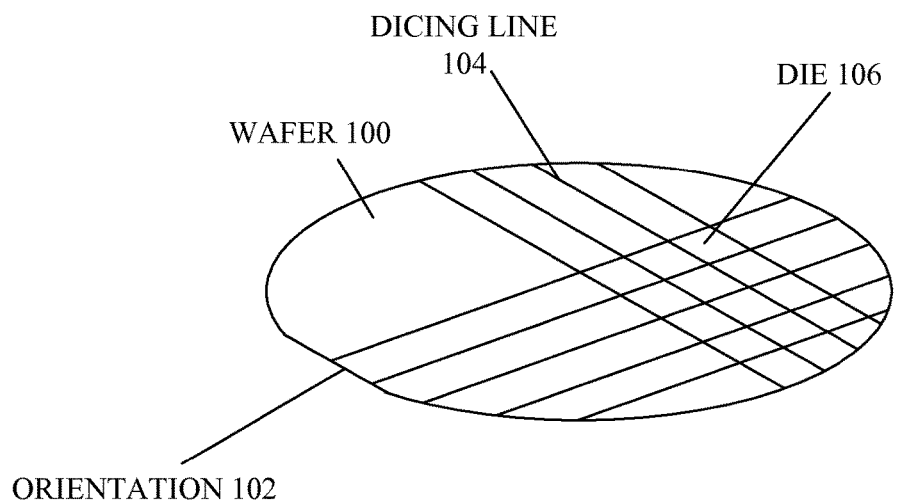
FIG. 1 illustrates a perspective view of a semiconductor wafer in an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR," and the use of the term "or" is intended to represent an "exclusive OR."

For integrated circuits in wireless communication devices or other high-speed digital electronics, a power delivery network supplies power to the various components of the overall system. A power delivery network may include a voltage regulator module that regulates voltage for a component. Suppressing resonance in a power delivery network may be performed using a capacitor. For example, surface mount technology (SMT) capacitors may reduce power delivery network resonance/noise in high power, system on chip devices, such as application processors and graphics processors.

A capacitor is an example of an electrical device used to store energy (e.g., charge) in an electrical field between closely spaced capacitor plates according to a capacitance value. This capacitance value provides a measure of the amount of charge stored by the capacitor at a certain voltage. In addition to their charge storing capability, capacitors are also useful as electronic filters because they enable differentiation between high frequency and low frequency signals.

An exemplary capacitor for suppressing resonance in a power delivery network is a multilayer ceramic chip capacitor (MLCC). This type of capacitor includes alternating ceramic and conductive material (e.g., metal) layers that are stacked to form a multilayer chip. An MLCC may exhibit increased inductance when operating above a self-resonance frequency. This increased inductance, however, is undesirable in power delivery networks. In particular, an MLCC with less inductive (e.g., lower equivalent series inductance (ESL)) and more capacitive (higher capacitance) characteristics is desirable for improving a decoupling effect in power delivery networks.

One aspect of the present disclosure relates to a passive discrete device with a modified internal/external electrode structure that reduces equivalent series inductance and increases capacitance. In one configuration, the reduced equivalent series inductance and increased capacitance are provided by extended, internal electrodes that are better able to confine an electric field between the electrodes. In this configuration, terminals of the multilayer ceramic capacitor device are modified to hold the extended internal electrodes. That is, the terminals of the device are each extended on one side for increasing overall electrical contact. The increased contact is with an extended area of the internal electrodes.

Various aspects of the disclosure provide techniques for fabrication of a passive discrete device having a modified internal/external electrode structure. The process flow for semiconductor fabrication of the passive discrete device may include front-end-of-line (FEOL) processes, middle-of-line (MOL) processes, and back-end-of-line (BEOL) processes. It will be understood that the term "layer" includes film and is not to be construed as indicating a vertical or horizontal thickness unless otherwise stated. As described herein, the term "substrate" may refer to a substrate of a diced wafer or may refer to a substrate of a wafer that is not diced. Similarly, the terms chip and die may be used interchangeably unless such interchanging would tax credulity.

A passive discrete device, according to an aspect of the present disclosure, includes a first asymmetric terminal and a second asymmetric terminal. In this configuration, the passive discrete device also includes first internal electrodes that are extended to electrically couple to a first side and a second side of the first asymmetric terminal. The passive discrete device further includes second internal electrodes that are extended to electrically couple to a first side and a second side of the second asymmetric terminal. In contrast to conventional terminals, the first and second terminals exhibit an asymmetric shape because they are modified to hold the extended first and second internal electrodes. As a result, the first asymmetric terminal and the second asymmetric terminal may be extended on one side to enable electrical coupling to an extended area of the first and second internal electrodes.

FIG. 1 illustrates a perspective view of a semiconductor wafer in an aspect of the present disclosure. A wafer 100 may be a semiconductor wafer, or may be a substrate material with one or more layers of semiconductor material on a surface of the wafer 100. When the wafer 100 is a semiconductor material, it may be grown from a seed crystal using the Czochralski process, where the seed crystal is dipped into a molten bath of semiconductor material and slowly rotated and removed from the bath. The molten material then crystalizes onto the seed crystal in the orientation of the crystal.

The wafer 100 may be a compound material, such as gallium arsenide (GaAs) or gallium nitride (GaN), a ternary material such as indium gallium arsenide (InGaAs), quaternary materials, or any material that can be a substrate material for other semiconductor materials. Although many of the materials may be crystalline in nature, polycrystalline or amorphous materials may also be used for the wafer 100.

The wafer 100, or layers that are coupled to the wafer 100, may be supplied with materials that make the wafer 100 more conductive. For example, and not by way of limitation, a silicon wafer may have phosphorus or boron added to the wafer 100 to allow for electrical charge to flow in the wafer 100. These additives are referred to as dopants, and provide extra charge carriers (either electrons or holes) within the wafer 100 or portions of the wafer 100. By selecting the areas where the extra charge carriers are provided, which type of charge carriers are provided, and the amount (density) of additional charge carriers in the wafer 100, different types of electronic devices may be formed in or on the wafer 100.

The wafer 100 has an orientation 102 that indicates the crystalline orientation of the wafer 100. The orientation 102 may be a flat edge of the wafer 100 as shown in FIG. 1, or may be a notch or other indicia to illustrate the crystalline orientation of the wafer 100. The orientation 102 may indicate the Miller Indices for the planes of the crystal lattice in the wafer 100.

Once the wafer 100 has been processed as desired, the wafer 100 is divided up along dicing lines 104. The dicing lines 104 indicate where the wafer 100 is to be broken apart or separated into pieces. The dicing lines 104 may define the outline of the various integrated circuits that have been fabricated on the wafer 100.

Once the dicing lines 104 are defined, the wafer 100 may be sawn or otherwise separated into pieces to form the die 106. Each of the die 106 may be an integrated circuit with many devices or may be a single electronic device. The physical size of the die 106, which may also be referred to as a chip or a semiconductor chip, depends at least in part on the ability to separate the wafer 100 into certain sizes, as well as the number of individual devices that the die 106 is designed to contain.

Once the wafer 100 has been separated into one or more die 106, the die 106 may be mounted into packaging to allow access to the devices and/or integrated circuits fabricated on the die 106. Packaging may include single in-line packaging, dual in-line packaging, motherboard packaging, flip-chip packaging, indium dot/bump packaging, or other types of devices that provide access to the die 106. The die 106 may also be directly accessed through wire bonding, probes, or other connections without mounting the die 106 into a separate package.

Figure 2:
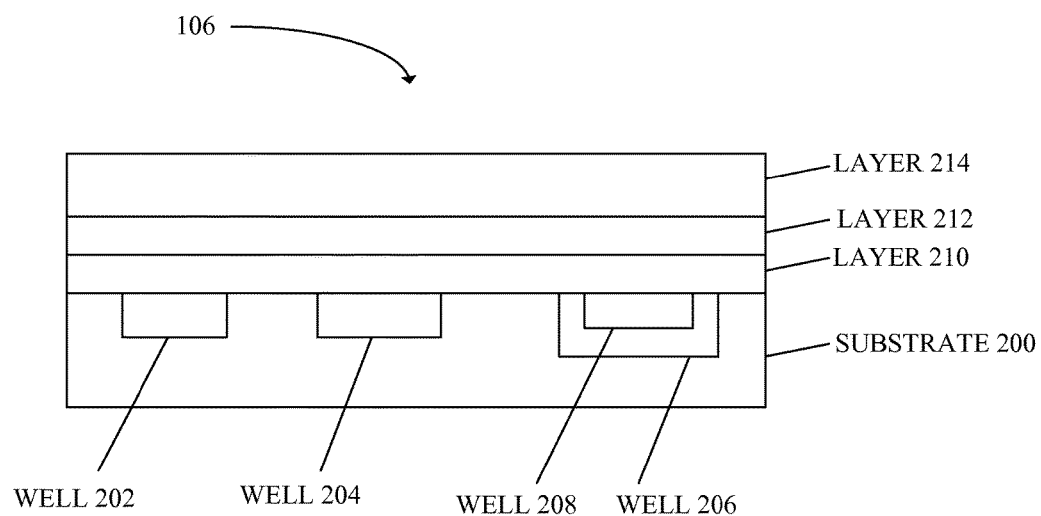
FIG. 2 illustrates a cross-sectional view of a die in accordance with an aspect of the present disclosure.

FIG. 2 illustrates a cross-sectional view of a die 106 in accordance with an aspect of the present disclosure. In the die 106, there may be a substrate 200, which may be a semiconductor material and/or may act as a mechanical support for electronic devices. The substrate 200 may be a doped semiconductor substrate, which has either electrons (designated N-channel) or holes (designated P-channel) charge carriers present throughout the substrate 200. Subsequent doping of the substrate 200 with charge carrier ions/atoms may change the charge carrying capabilities of the substrate 200.

Within a substrate 200 (e.g., a semiconductor substrate), there may be wells 202 and 204, which may be the source and/or drain of a field-effect transistor (FET), or wells 202 and/or 204 may be fin structures of a fin structured FET (FinFET). Wells 202 and/or 204 may also be other devices (e.g., a resistor, a capacitor, a diode, or other electronic devices) depending on the structure and other characteristics of the wells 202 and/or 204 and the surrounding structure of the substrate 200.

The semiconductor substrate may also have a well 206 and a well 208. The well 208 may be completely within the well 206, and, in some cases, may form a bipolar junction transistor (BJT). The well 206 may also be used as an isolation well to isolate the well 208 from electric and/or magnetic fields within the die 106.

Layers (e.g., 210 through 214) may be added to the die 106. The layer 210 may be, for example, an oxide or insulating layer that may isolate the wells (e.g., 202-208) from each other or from other devices on the die 106. In such cases, the layer 210 may be silicon dioxide, a polymer, a dielectric, or another electrically insulating layer. The layer 210 may also be an interconnection layer, in which case it may comprise a conductive material such as copper, tungsten, aluminum, an alloy, or other conductive or metallic materials.

The layer 212 may also be a dielectric or conductive layer, depending on the desired device characteristics and/or the materials of the layers (e.g., 210 and 214). The layer 214 may be an encapsulating layer, which may protect the layers (e.g., 210 and 212), as well as the wells 202-208 and the substrate 200, from external forces. For example, and not by way of limitation, the layer 214 may be a layer that protects the die 106 from mechanical damage, or the layer 214 may be a layer of material that protects the die 106 from electromagnetic or radiation damage.

Electronic devices designed on the die 106 may comprise many features or structural components. For example, the die 106 may be exposed to any number of methods to impart dopants into the substrate 200, the wells 202-208, and, if desired, the layers (e.g., 210-214). For example, and not by way of limitation, the die 106 may be exposed to ion implantation, deposition of dopant atoms that are driven into a crystalline lattice through a diffusion process, chemical vapor deposition, epitaxial growth, or other methods. Through selective growth, material selection, and removal of portions of the layers (e.g., 210-214), and through selective removal, material selection, and dopant concentration of the substrate 200 and the wells 202-208, many different structures and electronic devices may be formed within the scope of the present disclosure.

Further, the substrate 200, the wells 202-208, and the layers (e.g., 210-214) may be selectively removed or added through various processes. Chemical wet etching, chemical mechanical planarization (CMP), plasma etching, photoresist masking, damascene processes, and other methods may create the structures and devices of the present disclosure.

Figure 3A:
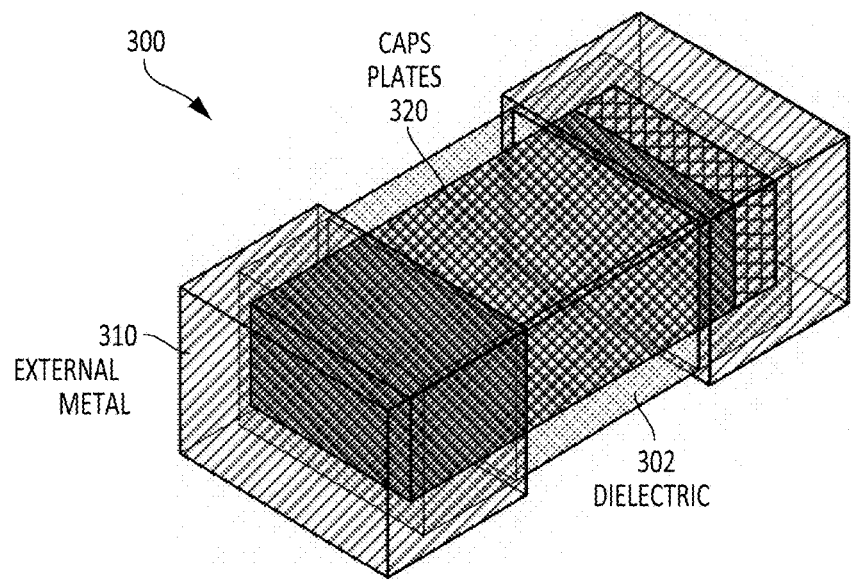
FIGS. 3A and 3B illustrate various views of a multilayer ceramic passive discrete device.
Figure 3B:
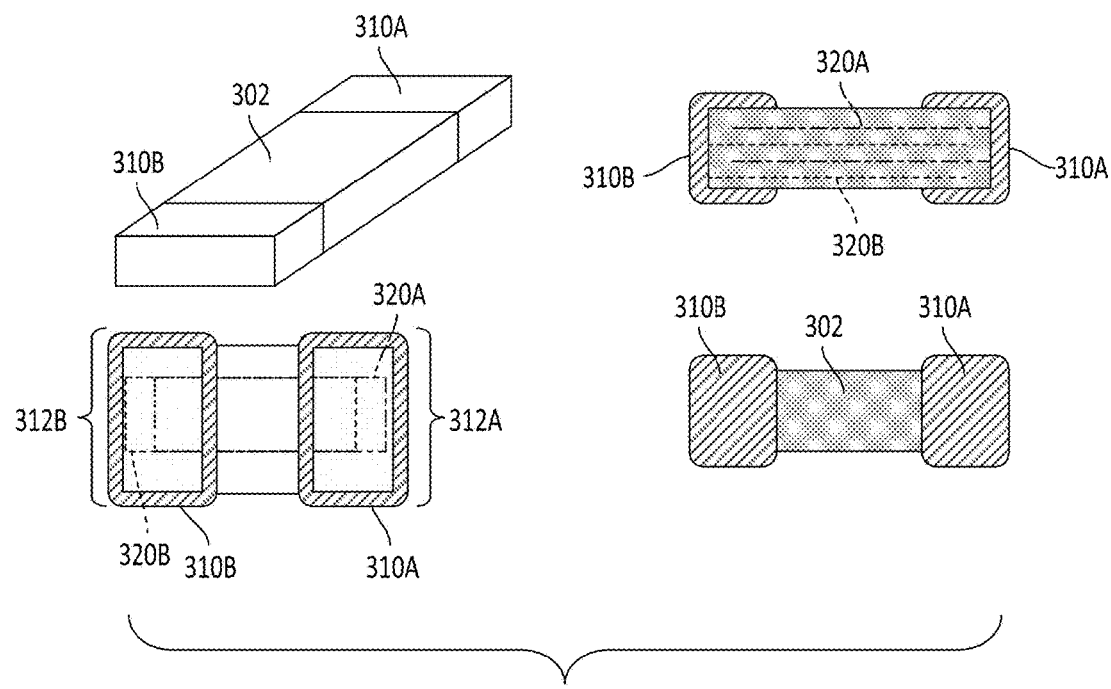

FIGS. 3A and 3B illustrate various views of a passive discrete device 300. FIG. 3A illustrates a perspective view of the passive discrete device 300 including layers of capacitor plates (e.g., 320) that are alternatingly coupled to external terminals (e.g., 310). The capacitor plates (e.g., 320) may be surrounded by a dielectric material (e.g., a multilayer ceramic body 302). The passive discrete device 300 may store energy (e.g., charge) in an electrical field between the capacitor plates (e.g., 320) according to a capacitance value. In addition to the charge storing capability, the passive discrete device 300 is also useful as an electronic filter by enabling differentiation between high frequency and low frequency signals.

FIG. 3B illustrates various views of the passive discrete device 300. The passive discrete device 300 may be used for suppressing resonance in a power delivery network when arranged as a multilayer ceramic capacitor (MLCC) device. In the perspective view, the passive discrete device 300 includes a first symmetric terminal 310A, a second symmetric terminal 310B and a multilayer ceramic body 302. As shown in the cutaway view, the passive discrete device 300 includes alternating ceramic and conductive material (e.g., metal) layers that are stacked to form a multilayer chip. Representatively, first inner electrodes 320A are electrically coupled (e.g., shorted) at one end to the first symmetric terminal 310A. Similarly, second inner electrodes 320B are electrically coupled (e.g., shorted) at one end to the second symmetric terminal 310B.

As shown in the top view, the first inner electrodes 320A are electrically coupled to only a first side 312A of the first symmetric terminal 310A. Similarly, the second inner electrodes 320B are electrically coupled to only a second side 312B of the second symmetric terminal 310B. As shown in the side view, the first symmetric terminal 310A and the second symmetric terminal 310B are of equal length. This arrangement of the passive discrete device 300 may exhibit increased inductance when operating above a self-resonance frequency. This increased inductance, however, is undesirable in power delivery networks. In particular, a passive discrete device with less inductive (e.g., lower equivalent series inductance (ESL)) and more capacitive (higher capacitance) characteristics is desirable for improving a decoupling effect in power delivery networks.

Figure 4A:
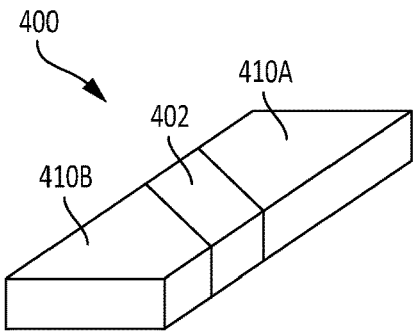
FIGS. 4A to 4E illustrate various views of a passive discrete device with a modified internal/external electrode structure according to aspects of the present disclosure.

FIGS. 4A to 4E illustrate various views of a passive discrete device with a modified internal/external electrode structure according to aspects of the present disclosure. As shown in FIG. 4A, a passive discrete device 400 includes a first asymmetric terminal 410A, a second asymmetric terminal 410B and a multilayer ceramic body 402 to conform with the modified internal/external electrode structure shown, for example, in FIGS. 4B to 4E. In aspects of the present disclosure, the modified internal/external electrode structure can provide reduced equivalent series inductance (ESL) and increased capacitance. In one configuration, the reduced equivalent series inductance and increased capacitance are provided by extending internal electrodes to provide an extended area that improves confinement of an electric field between the internal electrodes.

Figure 4B:
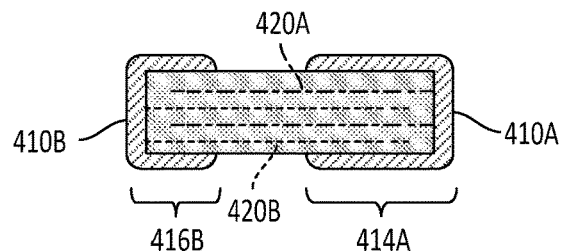

In the configuration shown in the cutaway view of FIG. 4B, a first asymmetric terminal 410A includes a second side 414A that is longer than a corresponding side 416B of a second asymmetric terminal 410B. The second side 414A of the first asymmetric terminal 410A is lengthened to hold an extended area of a first internal electrode 420A. That is, the first asymmetric terminal 410A of the passive discrete device 400 is extended on one side to enable electrical coupling to an extended area of the first internal electrode 420A, for example, as shown in the side view of FIG. 4D.

Figure 4C:
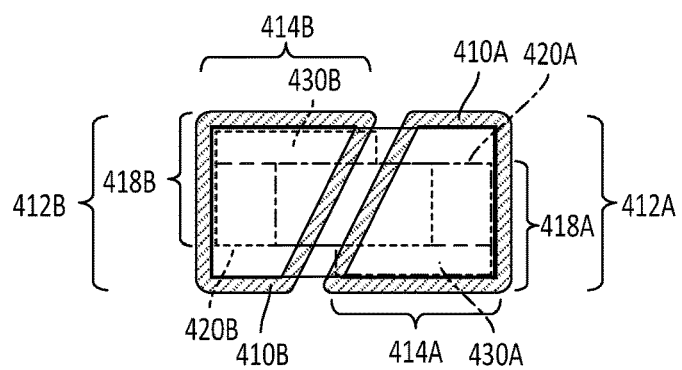
Figure 4D:
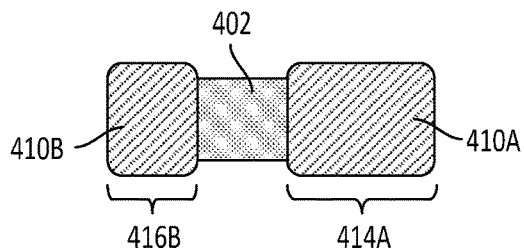

FIG. 4C is a top view further illustrating the passive discrete device 400 with a modified internal/external electrode structure according to aspects of the present disclosure. As shown in FIG. 4C, the passive discrete device 400 includes a first internal electrode 420A that is extended to electrically couple to a portion 418A of a first side 412A and a second side 414A of the first asymmetric terminal 410A. The passive discrete device 400 also includes a second internal electrode 420B that is also extended to electrically couple to a portion 418B of a first side 412B and a second side 414B of the second asymmetric terminal 410B.

As further illustrated in FIG. 4C, the extension of the first internal electrode 420A and the second internal electrode 420B, provides a first extended area 430A and a second extended area 430B. In this configuration, the first side 414A of the first asymmetric terminal 410A is extended to electrically couple to the first extended area 430A of the first internal electrode 420A. Similarly, the first side 414B of the second asymmetric terminal 410B is extended to electrically couple to the second extended area 430B of the second internal electrode 420B.

Figure 4E:
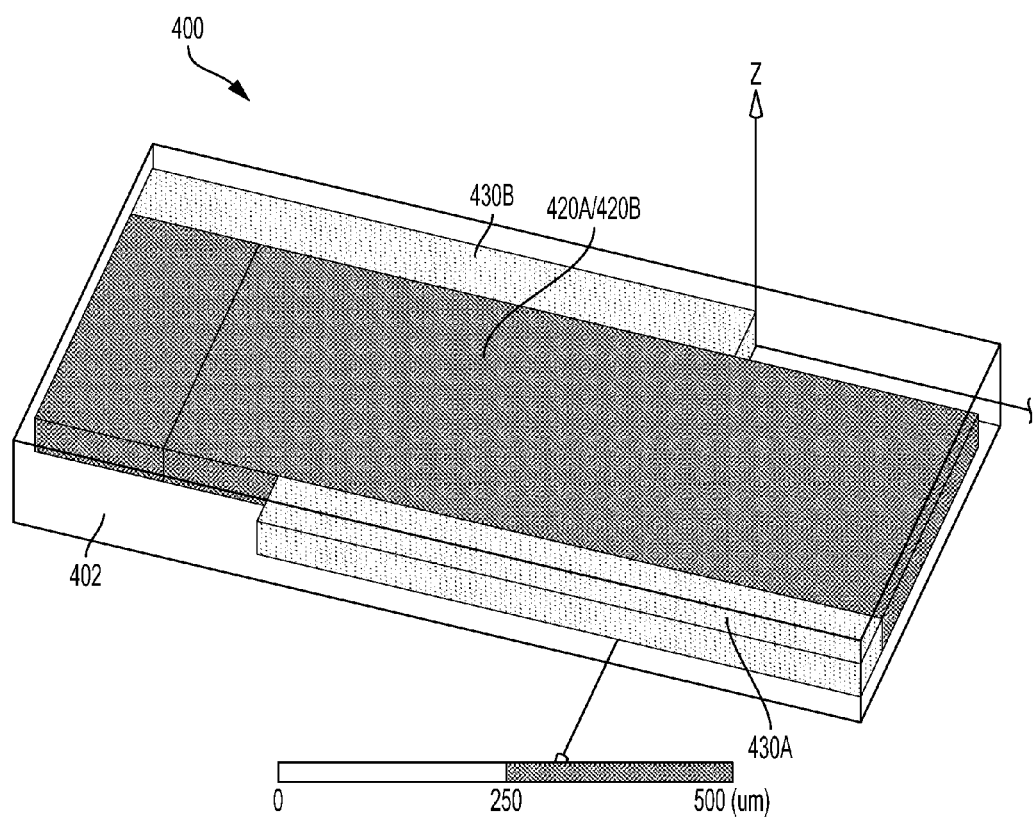

FIG. 4E shows a perspective view of the passive discrete device 400 including extended areas of the modified internal electrode structure according to aspects of the present disclosure. In this configuration, the first extended area 430A and second extended area 430B may enhance an electrical field formed between the first internal electrode 420A and the second internal electrode 420B. By contrast, as shown in FIG. 3B, the first inner electrodes 320A only contact the first side 312A of the first symmetric terminal 310A; and the second inner electrodes 320B only contact the first side 312B of the second symmetric terminal 310B. Consequently, the passive discrete device 300 FIG. 3B may exhibit increased inductance (e.g., increased equivalent series inductance (ESL)) when operating above a self-resonance frequency, which is undesirable in power delivery networks. This ESL, however, may be substantially decreased (e.g., a 30%) by the first extended area 430A and the second extended area 430B of the passive discrete device 400 shown in FIG. 4E.

Figure 5:
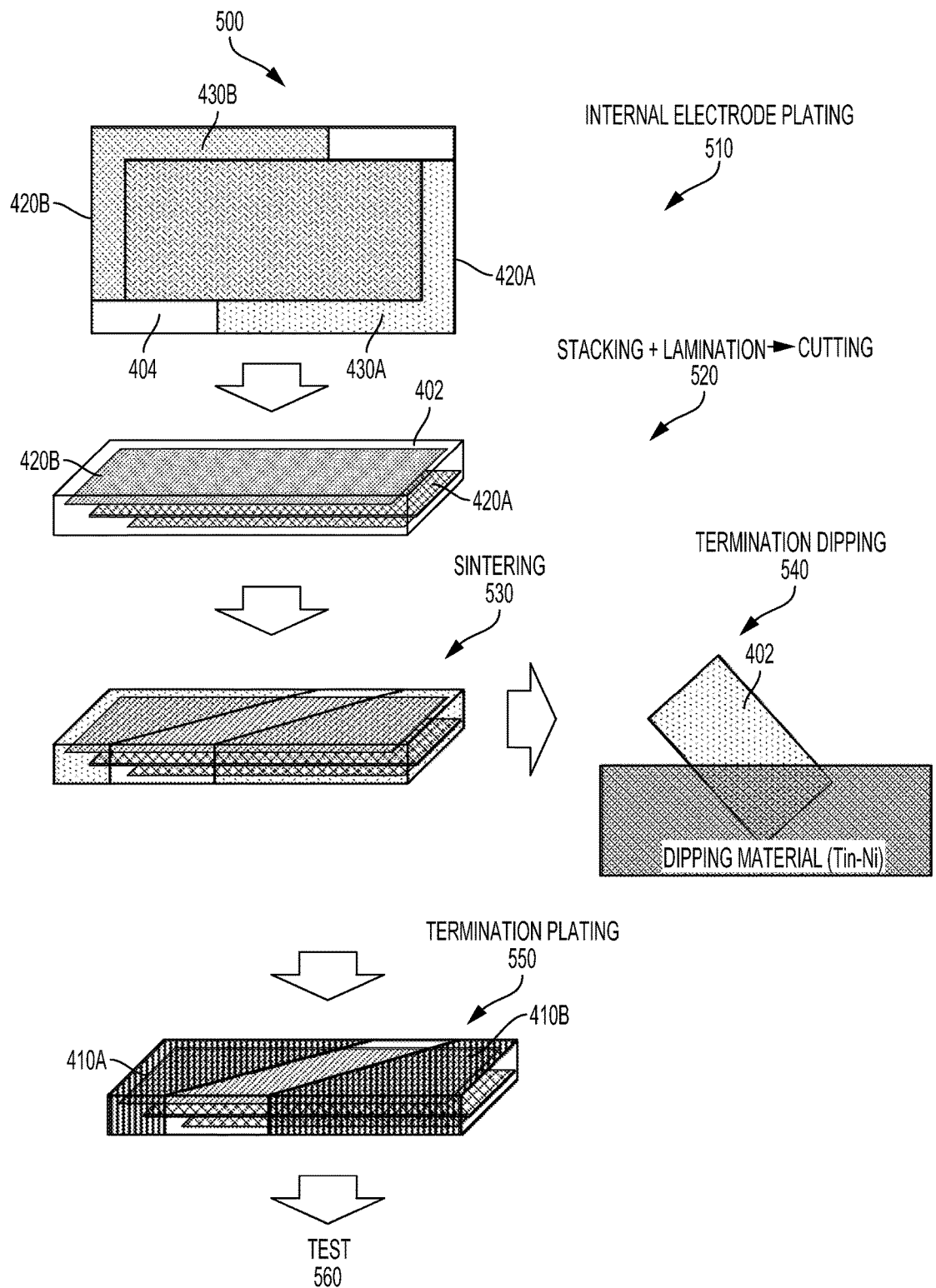
FIG. 5 further illustrates the passive discrete device of FIGS. 4A to 4E at various stages of fabrication according to aspects of the present disclosure.

FIG. 5 is a diagram illustrating a process 500 for fabricating a passive discrete device according to aspects of the disclosure. At step 510, a first internal electrode 420A and a second internal electrode 420B are plated within ceramic layers 404. For example, the first internal electrode 420A and the second internal electrode 420B are printed on one of the ceramic layers 404 (e.g., a first ceramic layer or a second ceramic layer) using a conductive material (e.g., a nickel (Ni) alloy). In this arrangement, the modified stencil is expanded to enable printing of the first extended area 430A and the second extended area 430B of the internal electrodes. At step 520, the ceramic layer may be stacked with other ones of the ceramic layers 404, then laminated and cut to form multiple multilayer ceramic bodies.

At step 530, a sintering process forms a multilayer ceramic body 402. In one aspect of the disclosure, the terminal formation process is modified to provide electrical coupling to the extended areas (e.g., the first extended area 430A and the second extended area 430B) using a symmetric structure for the terminals. At step 540, a termination dipping process is performed at a non-orthogonal angle (e.g., 45°) to define a first asymmetric terminal 410A and a second asymmetric terminal 410B. The multilayer ceramic body 402 is dipped into a conductive solution (e.g., Ni, Tin) at the non-orthogonal angle to conform with the extended areas of the extended internal electrodes. At step 550, a termination plating process is performed to complete the first asymmetric terminal 410A, which is plated to electrically couple to the first internal electrode 420A at a first side and a second side of the first asymmetric terminal 410A. In addition, the second asymmetric terminal 410B is plated to electrically couple to the second internal electrode 420B at a first side and a second side of the second asymmetric terminal 410B. The first asymmetric terminal 410A and the second asymmetric terminal 410B may be plated with a copper (Cu) alloy. At step 560, testing of the passive discrete device is performed.

In this aspect of the present disclosure, the passive discrete device 400 is provided with a modified internal/external electrode structure that reduces equivalent series inductance and increased capacitance. In one configuration, the reduced equivalent series inductance and increased capacitance are provided by extended, internal electrodes (e.g., the first extended area 430A and the second extended area 430B) that improve confinement of an electric field between the internal electrodes (e.g., 420A and 420B). In this configuration, the terminals (e.g., 410A and 410B) of the passive discrete device 400 are modified to hold the extended internal electrodes (e.g., 420A and 420B). That is, the terminals (e.g., 410A and 410B) are extended on one side to enable electrical coupling to an extended area (e.g., 430A and 430B) of the internal electrodes (e.g., 420A and 420B).

Figure 6:
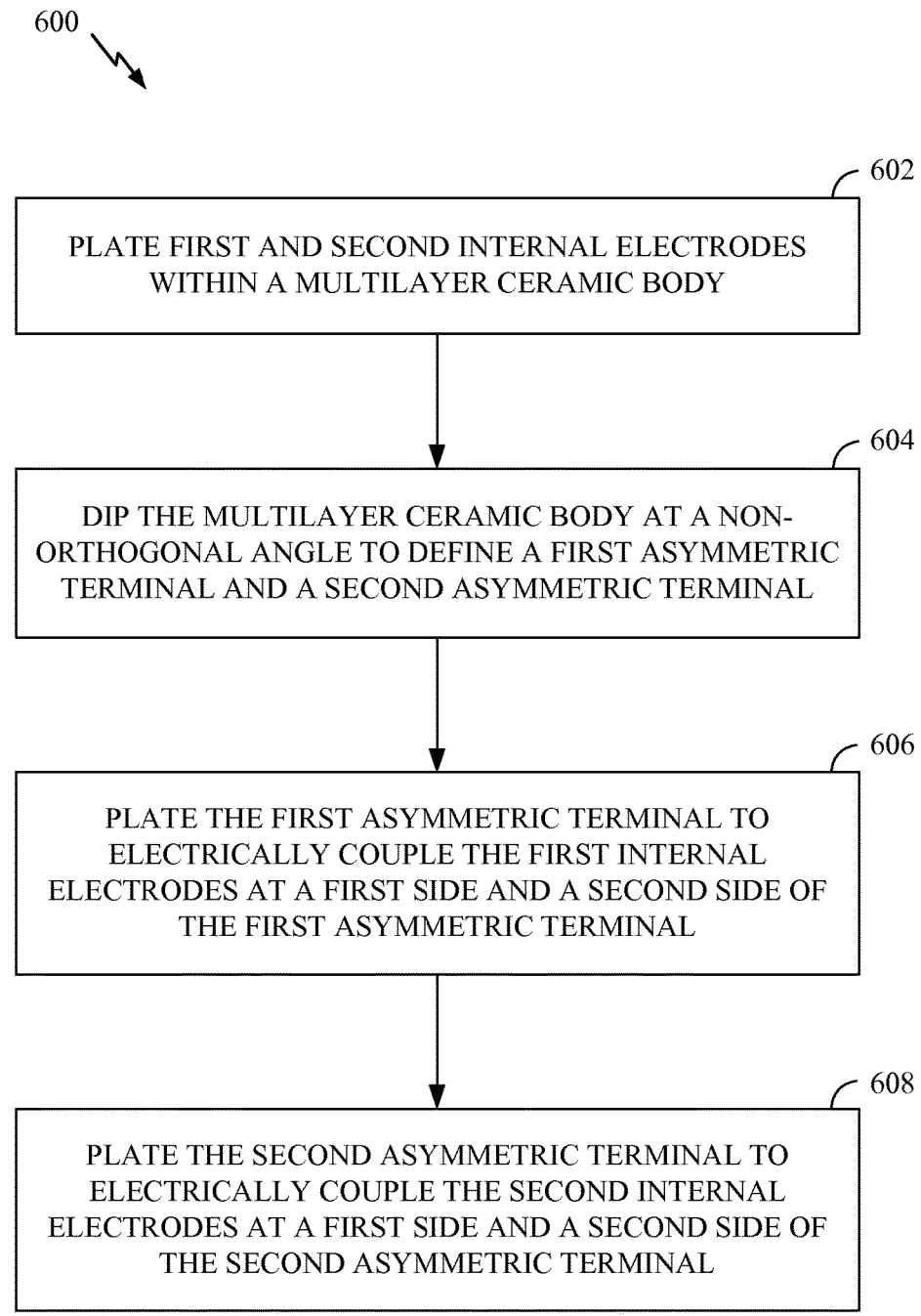
FIG. 6 is a process flow diagram illustrating a method for fabricating a passive discrete device according to an aspect of the present disclosure.

FIG. 6 is a flow diagram illustrating a method 600 for fabricating a passive discrete device according to aspects of the disclosure. At block 602, a first internal electrode and a second internal electrode are plated within a multilayer ceramic body. For example, as shown in FIG. 5, a first internal electrode 420A and a second internal electrode 420B are plated on one of the ceramic layers 404. In this arrangement, a printing stencil is modified to enable printing of extended areas (e.g., 430A and 430B) of the internal electrodes. This ceramic layer may be stacked with other ones of the ceramic layers 404, then laminated and cut to form multiple multilayer ceramic bodies.

Referring again to FIG. 6, at block 604, the multilayer ceramic body is dipped at a non-orthogonal angle to define a first asymmetric terminal and a second asymmetric terminal. As shown in FIG. 5, the multilayer ceramic body 402 is dipped into a solution at a non-orthogonal angle (e.g., 45°) to define the first asymmetric terminal 410A and the second asymmetric terminal 410B. At block 606, the first asymmetric terminal is plated to electrically couple the first internal electrodes at a first side and a second side of the first asymmetric terminal. At block 608, the second asymmetric terminal is plated to electrically couple the second internal electrodes at a first side and a second side of the second asymmetric terminal.

For example, as shown in FIG. 4C, the first internal electrode 420A is electrically coupled (e.g., shorted) to the first side 412A and the second side 414B of the first asymmetric terminal 410A. Similarly the second internal electrode 420B is electrically coupled (e.g., shorted) to the first side 412B and the second side 414B of the second asymmetric terminal 410B. In this arrangement, a first extended area 430A of the first internal electrode 420A and a second extended area 430B of the second internal electrode 420B enable improved confinement of an electrical field between, for example, the first internal electrode 420A and the second internal electrode 420B.

In one configuration, a passive discrete device includes a first asymmetric terminal and a second asymmetric terminal. The passive discrete device further includes a first means for electrically coupling to a first side and a second side of the first asymmetric terminal. The passive discrete device also includes a second means for electrically coupling to a first side and a second side of the second asymmetric terminal. In one aspect of the disclosure, the first means is the first internal electrode of FIGS. 4B to 4E, configured to perform the functions recited by the first means. In this aspect of the disclosure, the second means is the second internal electrode of FIGS. 4B to 4E, configured to perform the functions recited by the second means. In another aspect, the aforementioned means may be a device or any layer configured to perform the functions recited by the aforementioned means.

An exemplary capacitor for suppressing resonance in a power delivery network is a multilayer ceramic chip capacitor (MLCC). This type of capacitor includes alternating ceramic and conductive material (e.g., metal) layers that are stacked to form a multilayer chip. An MLCC may exhibit increased inductance when operating above a self-resonance frequency. This increased inductance, however, is undesirable in power delivery networks. In particular, an MLCC with less inductive (e.g., lower equivalent series inductance (ESL)) and more capacitive (higher capacitance) characteristics is desirable for improved a decoupling effect in power delivery networks.

One aspect of the present disclosure relates to a passive discrete device with a modified internal/external electrode structure that reduces equivalent series inductance and increased capacitance. In one configuration, the reduced equivalent series inductance and increased capacitance are provided by extended, internal electrodes. These internal electrodes each provide an extended area for further confinement of an electric field between the internal electrodes. In this configuration, terminals of the multilayer ceramic capacitor device are modified to hold the extended internal electrodes. That is, the terminals of the device are extended on one side to enable electrical coupling to the extended area of the internal electrodes.

Figure 7:
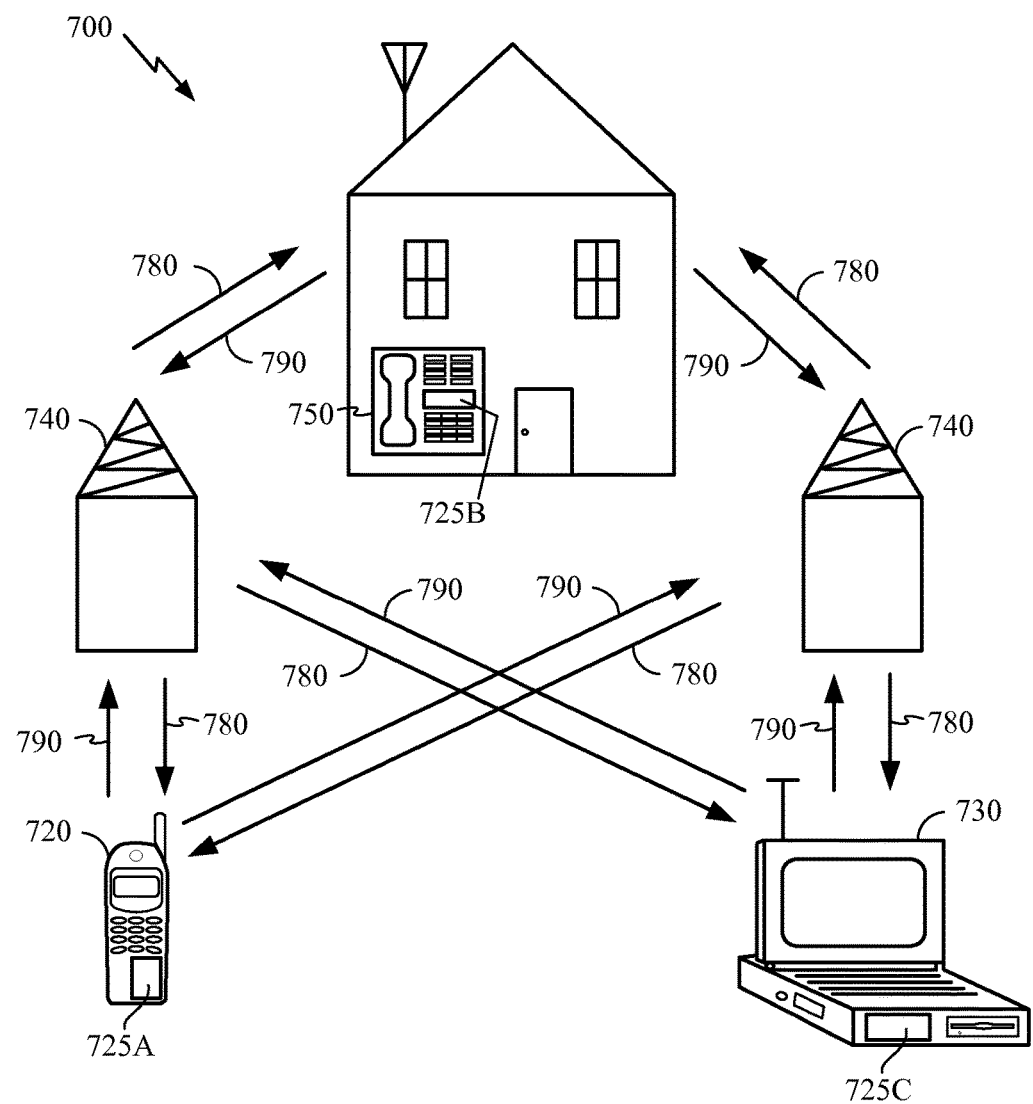
FIG. 7 is a block diagram showing an exemplary wireless communication system in which a configuration of the disclosure may be advantageously employed.

FIG. 7 is a block diagram showing an exemplary wireless communication system 700 in which an aspect of the disclosure may be advantageously employed. For purposes of illustration, FIG. 7 shows three remote units 720, 730, and 750 and two base stations 740. It will be recognized that wireless communication systems may have many more remote units and base stations. Remote units 720, 730, and 750 include IC devices 725A, 725C, and 725B that include the disclosed passive discrete device. It will be recognized that other devices may also include the disclosed passive discrete device, such as the base stations, switching devices, and network equipment. FIG. 7 shows forward link signals 780 from the base station 740 to the remote units 720, 730, and 750 and reverse link signals 790 from the remote units 720, 730, and 750 to base stations 740.

In FIG. 7, remote unit 720 is shown as a mobile telephone, remote unit 730 is shown as a portable computer, and remote unit 750 is shown as a fixed location remote unit in a wireless local loop system. For example, the remote units 720, 730, and 750 may be a mobile phone, a hand-held personal communication systems (PCS) unit, a portable data units such as a personal digital assistant (PDA), a GPS enabled device, a navigation device, a set top box, a music player, a video player, an entertainment unit, a fixed location data unit such as a meter reading equipment, or a communications device that stores or retrieves data or computer instructions, or combinations thereof. Although FIG. 7 illustrates remote units according to the aspects of the disclosure, the disclosure is not limited to these exemplary illustrated units. Aspects of the disclosure may be suitably employed in many devices, which include the disclosed devices.

Figure 8:
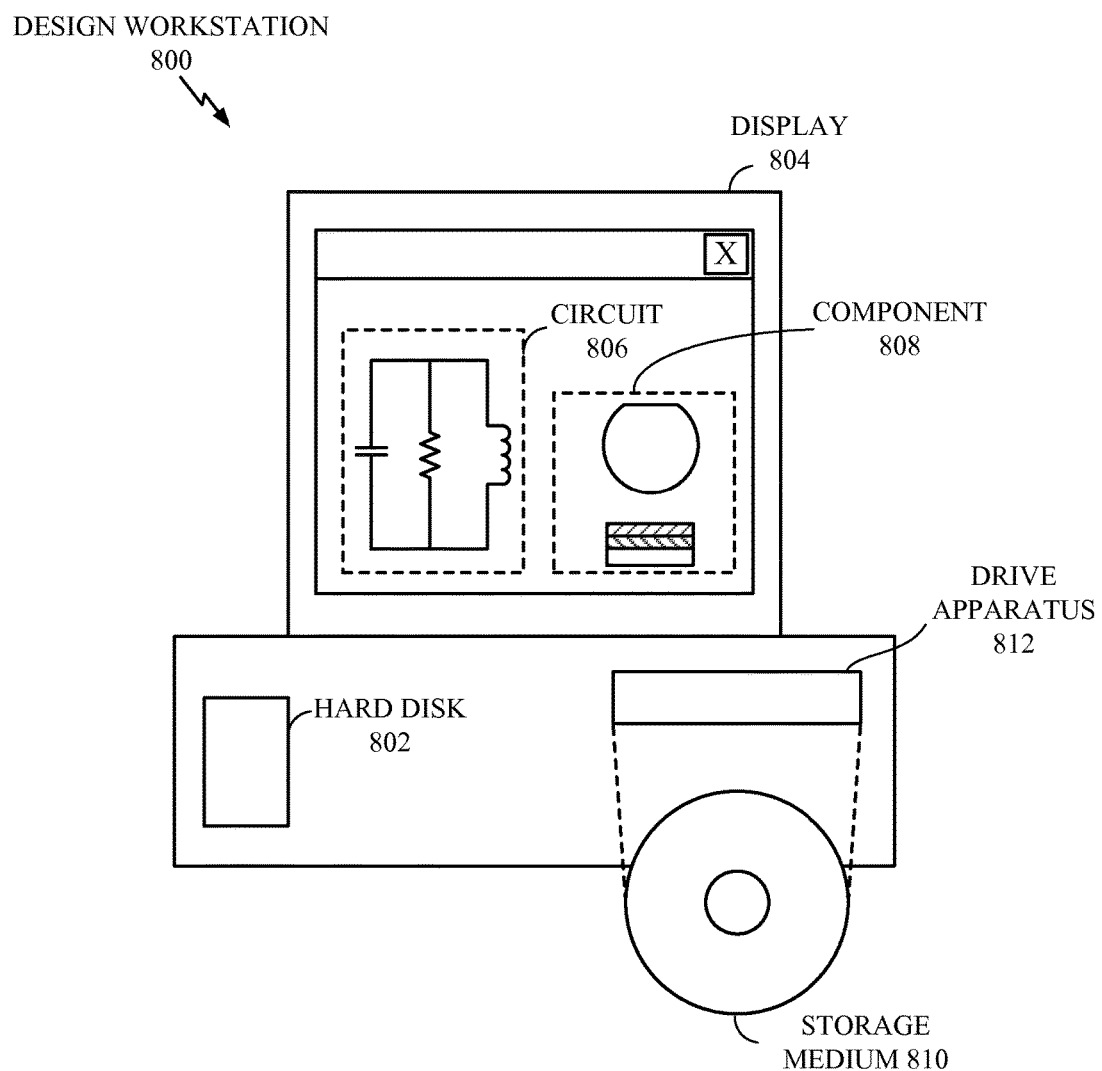
FIG. 8 is a block diagram illustrating a design workstation used for circuit, layout, and logic design of a semiconductor component according to one configuration.

FIG. 8 is a block diagram illustrating a design workstation used for circuit, layout, and logic design of a semiconductor component, such as the devices disclosed above. A design workstation 800 includes a hard disk 802 containing operating system software, support files, and design software such as Cadence or OrCAD. The design workstation 800 also includes a display 804 to facilitate design of a circuit 806 or a semiconductor component 808 such as a passive discrete device. A storage medium 810 is provided for tangibly storing the design of the circuit 806 or the semiconductor component 808. The design of the circuit 806 or the semiconductor component 808 may be stored on the storage medium 810 in a file format such as GDSII or GERBER. The storage medium 810 may be a CD-ROM, DVD, hard disk, flash memory, or other appropriate device. Furthermore, the design workstation 800 includes a drive apparatus 812 for accepting input from or writing output to the storage medium 810.

Data recorded on the storage medium 810 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 810 facilitates the design of the circuit 806 or the semiconductor component 808 by decreasing the number of processes for designing semiconductor wafers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus.

For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A passive discrete device, comprising:
   a first asymmetric terminal and a second asymmetric terminal;
   a plurality of first internal electrodes, comprising a first area electrically coupled at one end to a first side of the first asymmetric terminal, and a second area extended to electrically couple to the first side and along a length of a second side adjoined to the first side and distal from a third side of the first asymmetric terminal, a length of the third side of the first asymmetric terminal being shorter than the length of the second side of the first asymmetric terminal; and
   a plurality of second internal electrodes, comprising a third area electrically coupled at one end to a first side of the second asymmetric terminal, and a fourth area extended to electrically couple to the first side of the second asymmetric terminal and along a length of a second side adjoined to the first side and distal from a third side of the second asymmetric terminal, a length of the third side of the second asymmetric terminal being shorter than the length of the second side of the second asymmetric terminal.

2. The passive discrete device of claim 1, in which the plurality of first internal electrodes and the plurality of second internal electrodes comprise capacitor plates of a multilayer ceramic capacitor.

3. The passive discrete device of claim 1, in which the first asymmetric terminal and the second asymmetric terminal comprise terminals of a multilayer ceramic capacitor.

4. The passive discrete device of claim 1, in which a length of the first side of the first asymmetric terminal is equal to a length of the first side of the second asymmetric terminal, and the length of the second side of the first asymmetric terminal is equal to the length of the second side of the second asymmetric terminal.

5. The passive discrete device of claim 1, further comprising a rectangular, multilayer ceramic body surrounding the plurality of first internal electrodes and the plurality of second internal electrodes, in which the first side of the first asymmetric terminal is coupled to a lengthwise end of the rectangular, multilayer ceramic body, and the first side of the second asymmetric terminal is coupled to an opposing lengthwise end of the rectangular, multilayer ceramic body.

6. The passive discrete device of claim 1, incorporated into at least one of a music player, a video player, an entertainment unit, a navigation device, a communications device, a personal digital assistant (PDA), a fixed location data unit, and a computer.

7. A method of fabricating a passive discrete device, comprising:
   plating a plurality of first internal electrodes and a plurality of second internal electrodes within a multilayer ceramic body;
   dipping the multilayer ceramic body at a non-orthogonal angle to define a first asymmetric terminal and a second asymmetric terminal;
   plating the first asymmetric terminal to electrically couple the plurality of first internal electrodes at a first side of the first asymmetric terminal and to electrically couple the plurality of first internal electrodes along a length of a second side distal from a third side of the first asymmetric terminal, a length of the third side of the first asymmetric terminal being shorter than the length of the second side of the first asymmetric terminal; and
   plating the second asymmetric terminal to electrically couple the plurality of second internal electrodes at a first side of the second asymmetric terminal and to electrically couple the plurality of second internal electrodes along a length of a second side distal from a third side of the second asymmetric terminal, a length of the third side of the second asymmetric terminal being shorter than the length of the second side of the second asymmetric terminal.

8. The method of claim 7, in which the plating of the plurality of first internal electrodes and the plurality of second internal electrodes comprises:
   printing one of the plurality of first internal electrodes on a first ceramic layer and extending to a first edge and a second edge of the first ceramic layer;
   printing one of the plurality of second internal electrodes on a second ceramic layer and extending to adjacent edges of the second ceramic layer distal from the first edge and the second edge of the first ceramic layer; and
   stacking the first ceramic layer on the second ceramic layer.

9. The method of claim 7, further comprising incorporating the passive discrete device into at least one of a music player, a video player, an entertainment unit, a navigation device, a communications device, a personal digital assistant (PDA), a fixed location data unit, and a computer.

10. A passive discrete device, comprising:
    a first asymmetric terminal and a second asymmetric terminal;
    first means for electrically coupling to a first side of the first asymmetric terminal, comprising first means for extending electrically coupled to the first side and along a length of a second side adjoined to the first side and distal from a third side of the first asymmetric terminal, a length of the third side of the first asymmetric terminal being shorter than the length of the second side of the first asymmetric terminal; and
    second means for electrically coupling to a first side of the second asymmetric terminal, comprising second means for extending electrically coupled to the first side and along a length of a second side adjoined to the first side and distal from a third side of the second asymmetric terminal, a length of the third side of the second asymmetric terminal being shorter than the length of the second side of the second asymmetric terminal.

11. The passive discrete device of claim 10, in which the first means and the second means for electrically coupling comprise capacitor plates of a multilayer ceramic capacitor.

12. The passive discrete device of claim 10, in which the first asymmetric terminal and the second asymmetric terminal comprise terminals of a multilayer ceramic capacitor.

13. The passive discrete device of claim 10, in which a length of the first side of the first asymmetric terminal is equal to a length of the first side of the second asymmetric terminal, and the length of the second side of the first asymmetric terminal is equal to the length of the second side of the second asymmetric terminal.

14. The passive discrete device of claim 10, further comprising a rectangular, multilayer ceramic body surrounding the first means and the second means for electrically coupling, in which the first side of the first asymmetric terminal is coupled to a lengthwise end of the rectangular, multilayer ceramic body, and the first side of the second asymmetric terminal is coupled to an opposing lengthwise end of the rectangular, multilayer ceramic body.

15. The passive discrete device of claim 10, incorporated into at least one of a music player, a video player, an entertainment unit, a navigation device, a communications device, a personal digital assistant (PDA), a fixed location data unit, and a computer.

16. A method of fabricating a passive discrete device, comprising:
  a step for plating a plurality of first internal electrodes and a plurality of second internal electrodes within a multilayer ceramic body;
  a step for dipping the multilayer ceramic body at a non-orthogonal angle to define a first asymmetric terminal and a second asymmetric terminal;
  a step for plating the first asymmetric terminal to electrically couple the plurality of first internal electrodes at a first side of the first asymmetric terminal and to electrically couple the plurality of first internal electrodes along a length of a second side distal from a third side of the first asymmetric terminal, a length of the third side of the first asymmetric terminal being shorter than the length of the second side of the first asymmetric terminal; and
  a step for plating the second asymmetric terminal to electrically couple the plurality of second internal electrodes at a first side of the second asymmetric terminal and to electrically couple the plurality of second internal electrodes along a length of a second side distal from a third side of the second asymmetric terminal, a length of the third side of the second asymmetric terminal being shorter than the length of the second side of the second asymmetric terminal.

17. The method of claim 16, in which the step for plating the plurality of first internal electrodes and the plurality of second internal electrodes comprises:
  a step for printing one of the plurality of first internal electrodes on a first ceramic layer and extending to a first edge and a second edge of the first ceramic layer;
  a step for printing one of the plurality of second internal electrodes on a second ceramic layer and extending to adjacent edges of the second ceramic layer distal from the first edge and the second edge of the first ceramic layer; and
  a step for stacking the first ceramic layer on the second ceramic layer.

18. The method of claim 16, further comprising a step for incorporating the passive discrete device into at least one of a music player, a video player, an entertainment unit, a navigation device, a communications device, a personal digital assistant (PDA), a fixed location data unit, and a computer.

* * * * *